United States Patent
Barbeau

(10) Patent No.: US 7,408,660 B1
(45) Date of Patent: Aug. 5, 2008

(54) METHOD AND SYSTEM FOR MANAGING DELIVERY OF DIGITAL IMAGE FILES TO IMAGE PROCESSING LABS

(75) Inventor: Pierre Barbeau, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1041 days.

(21) Appl. No.: 10/215,287

(22) Filed: Aug. 8, 2002

(51) Int. Cl.
- G06F 3/12 (2006.01)
- H04N 1/40 (2006.01)
- H04N 1/21 (2006.01)
- H04N 9/04 (2006.01)
- G06Q 10/00 (2006.01)

(52) U.S. Cl. .............. 358/1.15; 358/1.16; 358/448; 358/302; 348/207.99; 348/333.02; 348/207.1; 705/26

(58) Field of Classification Search ........... 358/1.15, 358/1.16, 448, 302; 348/207.1, 207.2, 211.3, 348/211.2, 211.14, 231.5, 211.1, 231.2, 231.3, 348/207.99, 333.02; 379/102.02; 709/201, 709/203, 218; 455/556.1, 566; 396/2; 705/26
See application file for complete search history.

(56) References Cited

U.S. PATENT DOCUMENTS

| | | | |
|---|---|---|---|
| 5,327,144 A | 7/1994 | Stilp et al. | 342/387 |
| 5,386,117 A | 1/1995 | Piety et al. | 250/330 |
| 5,402,171 A | 3/1995 | Tagami et al. | 348/219.1 |
| 5,748,484 A | 5/1998 | Cannon et al. | 364/479.03 |
| 5,806,005 A | 9/1998 | Hull et al. | 455/566 |
| 5,943,603 A | 8/1999 | Parulski et al. | 725/133 |
| 6,282,362 B1 | 8/2001 | Murphy et al. | 386/46 |
| 6,344,853 B1 | 2/2002 | Knight | 345/629 |
| 6,359,837 B1 | 3/2002 | Tsukamoto | 368/10 |
| 6,396,537 B1 | 5/2002 | Squilla et al. | 348/239 |
| 6,449,485 B1 | 9/2002 | Anzil | 455/456.1 |
| 6,507,362 B1 | 1/2003 | Akerib | 725/109 |
| 6,573,927 B2 * | 6/2003 | Parulski et al. | 348/32 |
| 6,636,259 B1 * | 10/2003 | Anderson et al. | 348/211.3 |
| 6,657,661 B1 | 12/2003 | Cazier | 348/231.2 |
| 6,741,864 B2 | 5/2004 | Wilcock et al. | 455/456.1 |
| 6,813,385 B2 * | 11/2004 | Ideyama | 382/232 |
| 6,833,861 B2 | 12/2004 | Matsumoto et al. | 348/207.2 |

(Continued)

FOREIGN PATENT DOCUMENTS

DE  199 13 019 A 1  2/2001

(Continued)

OTHER PUBLICATIONS

EndRun Technologies, "Praecis Ce—OEM Time & Frequency Engine," printed on Apr. 4, 2002.

(Continued)

Primary Examiner—David K Moore
Assistant Examiner—Thomas J Lett

(57) ABSTRACT

A mechanism is disclosed for managing delivery of digital image files to image processing labs for printing. The mechanism involves marking a digital image file with metadata that indicates a processing lab at which an image in the file should be printed. In turn, the mechanism involves reading the metadata indication from the file to identify the processing lab where the image should be printed and responsively sending the image file to that designated processing lab. Such digital image files could be sent to an image hub, which could then read the metadata indications from the files and responsively route the files to designated processing labs for printing.

22 Claims, 4 Drawing Sheets

U.S. PATENT DOCUMENTS

| | | |
|---|---|---|
| 6,850,911 B1 * | 2/2005 | Huether ........................ 705/51 |
| 6,853,461 B1 | 2/2005 | Shiimori .................... 358/1.15 |
| 6,862,045 B2 | 3/2005 | Morimoto et al. ........... 348/515 |
| 6,911,992 B2 | 6/2005 | Bronstein et al. ............ 345/629 |
| 6,912,398 B1 | 6/2005 | Domnitz ...................... 455/461 |
| 6,914,626 B2 | 7/2005 | Squibbs .................... 348/231.3 |
| 6,941,276 B2 | 9/2005 | Haeberli ....................... 705/26 |
| 6,980,232 B2 * | 12/2005 | Suzuki ........................ 709/218 |
| 2002/0054224 A1 | 5/2002 | Wasula et al. ................ 348/232 |
| 2002/0137528 A1 | 9/2002 | Fraccaroli .................... 455/457 |
| 2003/0025796 A1 * | 2/2003 | Yamagishi ............... 348/207.2 |
| 2003/0137422 A1 | 7/2003 | Nishibori .................. 340/573.1 |
| 2003/0202101 A1 | 10/2003 | Monroe et al. .............. 348/156 |
| 2003/0206316 A1 | 11/2003 | Anderson et al. ........... 358/1.18 |
| 2004/0015191 A1 | 1/2004 | Otman et al. ................... 607/5 |

FOREIGN PATENT DOCUMENTS

| | | |
|---|---|---|
| WO | WO 00/75859 | 12/2000 |
| WO | WO 01/86511 A2 | 11/2001 |

OTHER PUBLICATIONS

Digital Imaging Group, Inc., "DIG35 Specification—Metadata for Digital Images," Version 1, Aug. 30, 2000.

Praecis Ce, OEM Time & Frequency Engine, EndRun Technologies, Nov. 14, 2000, pp. 1-2.

Symmetricom—Symmetricom's breakthrough clock technology uses CDMA signals for timing the network edge, http://www.symmetricom.com/news/020899.html, printed from the World Wide Web on Aug. 8, 2002.

JC Labs, Inc.—HSC-500×2 Camera, http://www.jclabs.com/hsc-500.html, printed from the World Wide Web on Feb. 25, 2002.

Meteor-II/MC, http://www.fabrimex.ch/meteor-i1.htm, printed from the World Wide Web on Feb. 25, 2002.

EndRun Technologies—Products—CDMA Technology, http:www.endruntechnologies.com/cdma.htm, printed from the World Wide Web on Aug. 8, 2002.

EndRun Technologies; Benefits of GPS vs. CDMA, http://www.endruntechnologies.com/gps-cdma.htm, printed from the World Wide Web on Jan. 18, 2002.

Point Grey Research, Dragonfly, IEEE-1394 Digital Camera, printed from the World Wide Web on Sep. 5, 2002.

Xeni Jardin, "Phonecam Nation." (Document recites it was posted on Jun. 10, 2003. Document was printed from the World Wide Web.).

TheKansasCityChannel.com, "Teen Uses Camera Phone to Thwart Apparent Abduction." (Document recites it was posted on Aug. 1, 2003. Document was printed from the World Wide Web.).

"Camera Phone Hang-up." (Document was posted on the World Wide Web at least as early as Dec. 23, 2003. Document was printed from the World Wide Web.).

"What to do when you're in an Accident." (Document was posted on the World Wide at least as early as Feb. 18, 2004. Document was printed from the World Wide Web.).

Audio Device, Tracking System, http://www.spyshopusa.com/Tracking_S.htm, printed from the World Wide Web on Apr. 1, 2002.

Technical Metadata for Digital Still Images—National Information Standards Organization (NISO), http://www.niso.org/committees/committee_au.html, printed from the World Wide Web on Apr. 25, 2002.

Portelligent, Epson Location Organizer with Camera & GPS Performance and Design Analysis, Report & 140-991020-1b, 2000.

Harvard University Library: Digital Repository Service (DRS), "DRS Documentation—Administrative Metadata for Digital Still Images," v.1.2, Feb. 20, 2002.

Cat-Photo Standard 2.0 Tags, Cat-Photo Information, http://www.cat-photo.sourceforge.net/standard/tags.html, printed from the World Wide Web on Apr. 23, 2002.

Trimble Navigation Ltd.—GPS Software—ODELCO, Media Mapper, http://www.odelco.com/TRIMBLE/mmapper.htm, printed from the World Wide Web on Apr. 1, 2002.

"Datum Unveils Breakthrough Timing Technology for Telecommunications, Enterprise and OEM Applications," Press Release dated Feb. 8, 1999.

EOM Archives, http://www.eomonline.com/Common/Archives/November%2098/g2.htm, printed from the World Wide Web on Apr. 2, 2002.

EndRun Technologies, CDMA Timing Technology: No Antenna Hassle, http://www.enruntechnologies.com/cdma.htm, printed from the World Wide Web on Feb. 19, 2002, reprinted in full on Mar. 6, 2003.

EndRun Technologies, "Praecis Ce—OEM Time & Frequency Engine," printed on Feb. 19, 2002.

"It's a camera, a PDA, a phone! It's Origami!," http://www.nwfusion.com/columnishts/2002/1126cooltools.html, printed from the World Wide Web on Apr. 1, 2002.

IBM, "IBM 340 MB Microdrive—Transmforming Storage Technology," 1998.

Digital Imaging Group, Inc., "DIG35 Specification—Metadata for Digital Images," Version 1.1 Working Draft, Apr. 16, 2001.

I3A-DIG35, "Metadata Standards A Smarter Way to Look at Digital Images," http://www.i3a.org/l_dig35.html, printed from the World Wide Web on Apr. 29, 2002.

Overview, http://www.geospatialexperts.com/gpl/help/overview.html, printed from the World Wide Web on Apr. 29, 2002.

Image Archive, http://ocean.ucc.ie/00/hanrahag/minipro/html, printed from the World Wide Web on Apr. 29, 2002.

Microsoft Windows Platform Development, "MetaData in Image Files and GDI+," http://www.microsoft.com/hwdev/tech/display/GDIplus_Metadata.asp, printed from the World Wide Web on Apr. 29, 2002.

NISO Draft Standard, "Data Dictionary—Technical Metadata for Digital Still Images," Working draft, 1.0, Jul. 5, 2000.

* cited by examiner

METHOD AND SYSTEM FOR MANAGING DELIVERY OF DIGITAL IMAGE FILES TO IMAGE PROCESSING LABS

BACKGROUND OF THE INVENTION

1. Field of the Invention

The present invention relates to digital photography and, more particularly, to delivery of digital image files to image processing labs.

2. Description of Related Art

The art and popularity of digital photography has grown significantly over recent years. As a general matter, digital photography is very similar to conventional film-based photography, except that photographs taken with a digital camera are stored as digital files rather than being recorded on film. Digital photography thereby provides users with immediate access to photographs without the need for film developing.

Typically, a digital camera will receive and resolve light into an array of pixels that cooperatively represent an image, and the camera will produce digital representations of each pixel, reflecting image characteristics such as color and intensity. The camera will then store the digital pixel representations together in a digital image file, usually on a removable storage medium such as a Flash memory card for instance. Most digital cameras further include an LCD display screen that a user can employ as a viewfinder and to selectively view stored images. Further, a user can typically transfer images from a digital camera onto a personal computer, for viewing, e-mailing, storing and editing, through a cable connection between the camera and computer, or by removing a memory card from the camera and coupling the card to the computer.

Provided with the ability to capture and instantly view and manipulate digital images, users of digital cameras tend to build large collections of digital image files, which users can view electronically. Ultimately, however, users often want to print some or all of their digital images, in order to share hard copies of the images with friends and family, to store the hard copies in photo albums and scrapbooks, or for other reasons.

Recent advances in ink jet printers have enabled users to print photos at home. However, many users do not own a suitable photo printer. And users who do own a home printer may encounter difficulty or otherwise be dissatisfied with the home printing process. For instance, users who print photos at home often have to cut the photos to size after printing, which is burdensome. Further, ink jet printed photos might not be as colorfast as photos printed by exposing light on photo paper, so users may prefer the traditional photo printing process.

Responding to this need, many companies have begun to offer online photo printing services or online "processing labs." Typically, these services are accessible over the Internet or over some other data network. In operation, a user can send digital image files to a desired online processing lab, through e-mail or web posting (e.g., file-transfer-protocol). The processing lab then receives the files, prints the underlying images (preferably on high quality photo paper, and preferably with traditional light exposure mechanisms, rather than ink-jet printing), and then ships the printed images to the user.

SUMMARY

In accordance with an exemplary embodiment, a mechanism is provided for managing delivery of digital image files to image processing labs. As a general matter, the exemplary mechanism involves marking a digital image file with a metadata indication of a processing lab at which the image should be printed. Thereafter, an entity such as a digital camera, communication station or network server may read the metadata indication from the image file so as to identify the designated processing lab and may then send the image file to that designated processing lab for printing. Various combinations of these functions are possible.

In one respect, for instance, the exemplary embodiment may take the form of a method that involves (i) storing in a digital image file a metadata indication of a processing lab at which the underlying image should be printed and (ii) thereafter reading that metadata indication to determine the processing lab and responsively sending the digital image file to that processing lab for printing.

And in another respect, the exemplary embodiment may take the form of a method that involves reading from a digital image file a metadata indication of a processing lab at which the underlying image should be printed and responsively sending the digital image file to that processing lab for printing.

Still further, in another respect, the exemplary embodiment may take the form of a method that involves (a) capturing an image into a digital camera, (b) storing the image as an image file in the digital camera, (c) receiving into the digital camera a user-instruction specifying a processing lab at which the image should be printed, (d) storing an indication of the specified processing lab as metadata in the image file, and (e) subsequently (i) reading the indication of the specified processing lab from the metadata in the image file, and (ii) responsively sending the image file over a data network to the specified processing lab for printing.

In this regard, the image file may be sent from the digital camera over the data network, for receipt by the specified processing lab. For instance, the image file could be sent wirelessly from the digital camera to a cellular base station and thereafter over a data network to the processing lab.

Additionally, in an exemplary embodiment, after capturing the image into the digital camera, the digital camera could prompt a user to provide the user-instruction that specifies the processing lab. In this regard, the method could further involve presenting the image on a display screen of the digital camera. And the digital camera could present a text prompt on the display screen, concurrently with the image, requesting the user to select from a set of available processing labs.

According to the exemplary embodiment, the indication of processing lab will be stored in the image file in the digital camera. In turn, the image file, including the indication of processing lab, can be sent from the digital camera to a communication device such as a cellular mobile terminal (e.g., 3G station). And the communication device can function to read the processing lab indication from the image file and send the image file over the data network to the processing lab. In this regard, the process of sending the image file over a data network to the processing lab could involve sending the image file over a communication path that includes an air interface link from the communication device (e.g., an air interface between the communication device and a cellular base station).

In yet another respect, the exemplary embodiment may take the form of a method that involves (a) capturing an image into a digital camera, (b) storing the image as an image file in the digital camera, (c) receiving a user-instruction specifying a processing lab at which the image should be printed, (d) responsive to the user-indication, storing in the image file a metadata indication of the specified processing lab, and (e) sending the image file from the digital camera to an image hub, so that the image hub receives the image file, including the metadata indication of the specified processing lab, and thereby learns where the image should be printed.

The image hub could be a communication device or network server with which the digital camera communicates over a wired or wireless link. And the digital camera could insert the processing lab indication into the image file before sending it to the image hub. Alternatively, the image file could be transferred from the digital camera to an intermediate entity such as a communication device, and that intermediate entity may then insert the processing lab indication into the digital image file and pass the image file (including the processing lab indication) on to the image hub.

Further, the digital camera or intermediate entity could include cellular communication functionality. With that, the digital camera or intermediate entity could thus send the image file over an air interface to a cellular base station for transmission of the image file, in turn, to the image hub.

In addition, the method could involve receiving the image file at the image hub, reading the metadata processing lab indication from the image file and, based on that indication, sending the image file from the image hub to the specified processing lab, so as to facilitate printing of the image at the specified processing lab.

Further, in yet another respect, the exemplary embodiment could take the form of a digital camera that is operable (i) to capture and store a digital image, (ii) to receive a user-instruction specifying a processing lab at which the image should be printed and (iii) to responsively store in the digital image file a metadata indication of the specified processing lab.

In this regard, for instance, the digital camera may include (a) a lens for receiving light indicative of an image, (b) data storage for storing a digital image file representative of the image, (c) a processor, (d) a user interface, and (e) program instructions executable by the processor (i) to receive, from the user interface, a user-instruction specifying a processing lab at which the image should be printed and (ii) to responsively store in the digital image file a metadata indication of the specified processing lab.

The digital camera may also include a network communication interface coupled with the processor (i.e., arranged to communicate with the processor). And the program instructions could be executable by the processor to read the metadata indication of the specified processing lab from the digital image file and to responsively transmit the digital image file, via the network communication interface, to the specified processing lab. In a preferred embodiment, the network communication interface would be a wireless interface unit, which wirelessly transmits the digital image file. For instance, the wireless interface unit could be a CDMA interface unit.

Additionally, the user interface of the digital camera could include a display screen. And the program instructions could be executable by the processor to present on the display screen a prompt that requests the user to provide the user-instruction. For instance, as noted above, the prompt could be presented concurrently with a display of the captured image.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

As noted above, an exemplary embodiment of the present invention contemplates marking a digital image file with metadata that indicates a processing lab at which the underlying image should be printed, and/or reading such a metadata processing lab indication from a digital image file and then sending the image file to the designated processing lab based on that metadata indication.

Figure 1:
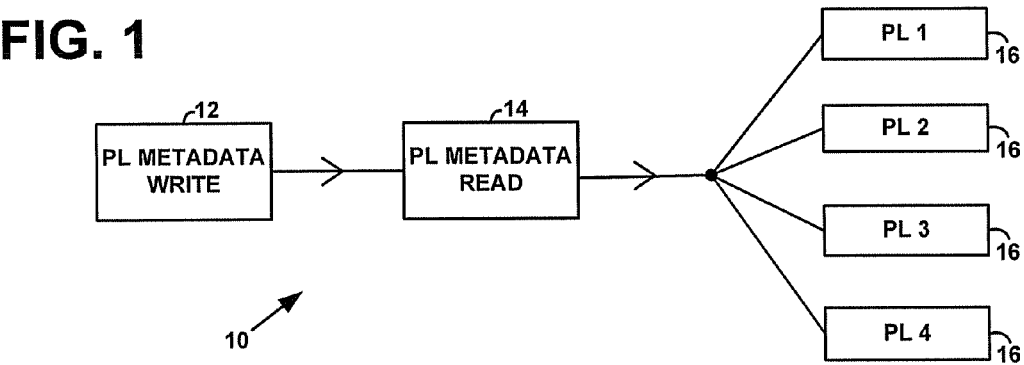
FIG. 1 is a simplified block diagram showing functional components of a system arranged to carry out the exemplary embodiment.

Referring to the drawings, FIG. 1 is a simplified block diagram showing functional components of a system 10 arranged to carry out this exemplary embodiment. As shown in FIG. 1, system 10 includes a write-block 12, a read-block 14, and a plurality of image processing lab blocks 16 (designated PL1, PL2, PL3 and PL4).

Generally speaking, the write-block 12 functions to store in a digital image file a metadata indication of a processing lab 16 at which the image in the file should be printed. And the read-block 14 functions to read that metadata processing lab indication from the digital image file and to send the digital image file to the designated processing lab.

In turn, each processing lab 16 functions to print images from digital image files. (For instance, a processing lab could receive digital image files at a particular web site, and technicians or an automated system can then receive the image files and print the images on photo paper. In this regard, a processing lab that operates under a given trade name or domain name could print images by doing so itself or by outsourcing the function to a sub-contractor, vendor or the like so as to facilitate printing. In any case, the images would be considered to be printed at (or, equivalently, by) the processing lab.

Although FIG. 1 shows the write-block 12 and read-block 14 as separate functional components, it should be understood that these functions could equally reside in a common device, such as a digital camera or communication terminal for instance. As such, the common device would write the metadata indication into the digital image file and then later read the indication from the file to determine where to send the image file for printing.

Further, although FIG. 1 shows four exemplary processing labs 16, it should be understood more generally that the system could include any number of processing labs (provided that there are at least two, so that it makes sense to specify one at which an image should be printed). Still further, it should be understood that the connecting links shown in FIG. 1 could take various forms, whether wired or wireless. And the arrangement of FIG. 1 could include other elements and can take still other forms as well.

Figure 2:
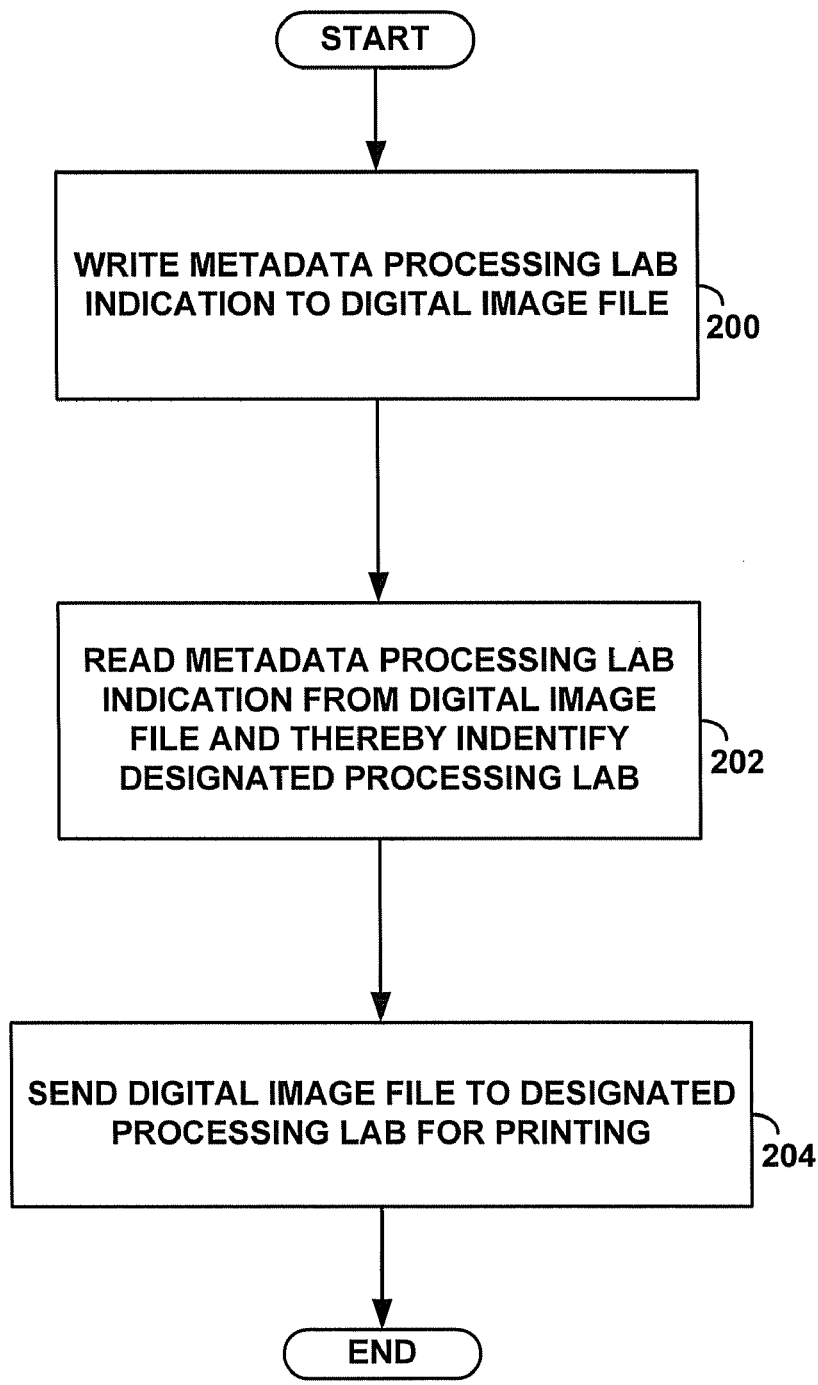
FIG. 2 is a flow chart depicting functions that can be carried in accordance with the exemplary embodiment.

Referring next to FIG. 2, a flow chart is provided to illustrate functions that can be carried out in accordance with the exemplary embodiment. A shown in FIG. 2, at block 200, the write block 12 writes into a digital image file a metadata indication of a processing lab to which an image in the file should be sent for printing. The processing lab may be any one of labs 16. At block 202, the read block thereafter reads the metadata indication from the file and thereby identifies the processing lab to which the image should be sent for printing. In response, at block 204, the read block sends the image file along to the designated processing lab for printing.

Figure 3:
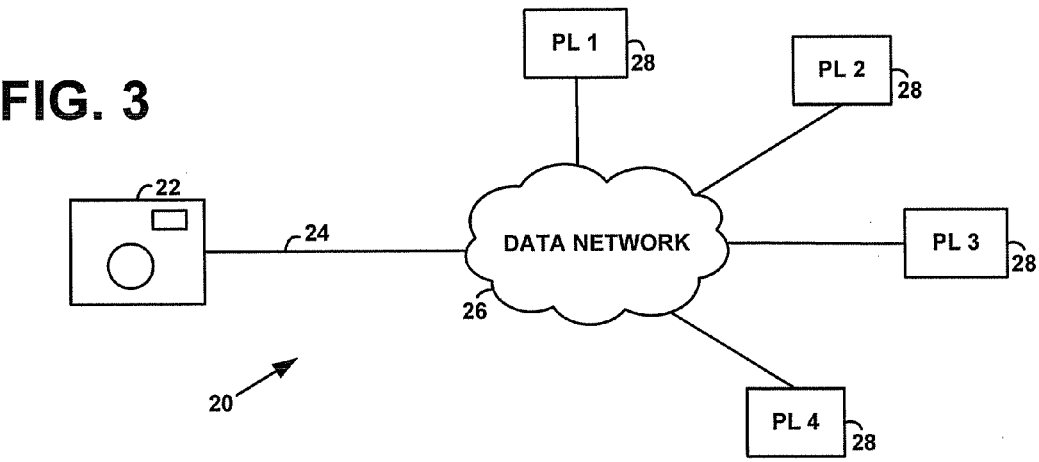
FIG. 3 is a more particular arrangement of the system shown in FIG. 1.

Turning now to FIG. 3, a more particular system arrangement 20 is shown. In this arrangement 20, a digital camera 22 has a communication path 24 with (or including) a data network 26. And a plurality of processing labs 28 reside on, or are accessible through, the data network 26. In this arrangement, the digital camera 22 can capture an image and store the image in a digital image file, and the digital camera can write into the digital image file a metadata indication of a processing lab at which the image should be printed. Alternatively, the digital camera may already have a digital image file that contains a metadata indication of a processing lab at which the image should be printed.

The digital camera may then read the metadata indication from the image file so as to determine where the file should be sent for printing. And the digital camera may then send the image file over communication path 24, through data network 26, to the designated processing lab for printing.

Figure 4:
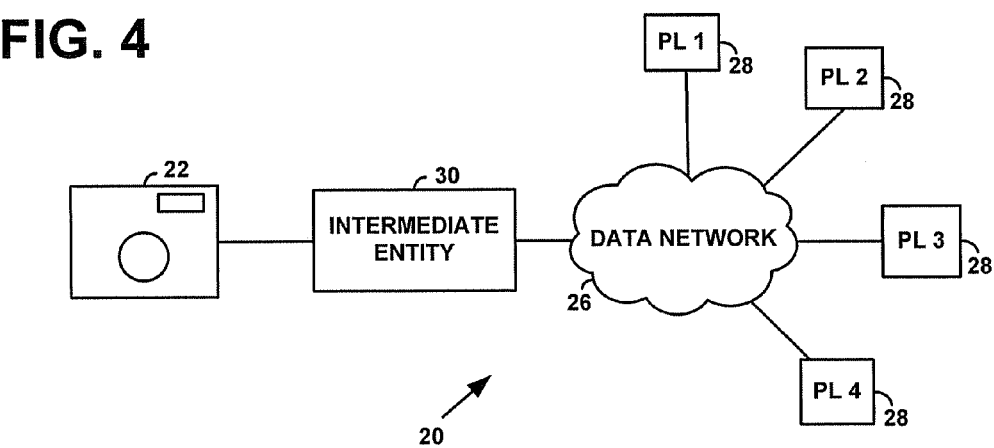
FIG. 4 is another more particular arrangement of the system shown in FIG. 1.

Alternatively, an intermediate entity of some sort could reside within communication path 24 between the digital camera and the processing labs 28, as shown generally in FIG. 4, and could carry out the writing and/or reading functions. For instance, the intermediate entity could receive a digital image file from camera 22 and could insert into the image file a metadata indication of a processing lab at which the image should be printed. Alternatively or additionally, the intermediate entity could read such a metadata processing lab indication from a digital image file and could responsively route the digital image file to the designated processing lab for printing.

The intermediate entity 30 could take various forms and could sit at various locations within the communication path 24. For example, intermediate entity 30 could be a client communication device, such as a cellular mobile station (e.g., CDMA, GSM, 802.11, etc.) or a networked landline computer. A user could then take a picture with the digital camera 22 and transfer the resulting digital image file from the camera 22 directly or indirectly (and through a wired or wireless connection—e.g., Bluetooth) to the communication device 30. If the camera or another entity had already written a metadata processing lab indication into the digital image file, then the communication device 30 could read that metadata indication in order to determine where to send the file for printing. Alternatively, the communication device itself could write the metadata indication into the file and later read the indication and route the file via network 26 to the designated processing lab.

And as another example, the intermediate entity 30 could be a network server that functions as an image hub to route digital image files to processing labs based on metadata processing lab indications in the files. As such, the image hub could receive a digital image file from the digital camera or from some other intermediate entity, and the image hub can read the metadata processing lab indication from the file. The image hub can then route the image file over data network 26 to the designated processing lab for printing.

Advantageously, such an image hub could be centrally located on data network 26 or in an access channel to network 26, so that multiple users could provide digital image files to the hub, and the hub could route the images to processing labs as indicated by the metadata processing lab indications in the various files. As a particular example, the image hub could take the form of a kiosk (e.g., in a shopping mall, camera store, or elsewhere), where users could connect their digital cameras so as to transfer files for printing. The kiosk could then read the metadata processing lab indications in each transferred file and route the files to the designated processing labs accordingly. Still further, the image hub could generally represent a network of routers, switches and/or other entities (e.g., many hubs linked with a central server), for collectively routing image files to processing labs as designated by metadata in the files.

According to the exemplary embodiment, a digital camera or other entity (e.g., intermediate entity such as a communication device) could establish and write a metadata processing lab indication into a digital image file in various ways. For example, the entity could prompt a user to specify a processing lab at which a given image should be printed and could then establish a metadata indication of that specified processing lab and write that metadata indication in the digital image file of that image.

In this regard, the entity could present a user with a list of available processing labs and could prompt the user to select one of the processing labs. For instance, the entity could display the image to the user and present the list and/or prompt superimposed on, or otherwise concurrently with, the image. Alternatively, the entity could allow a user to otherwise specify a desired processing lab, such as through voice or text input. And still alternatively, the entity could be programmed to specify a particular processing lab by default and could therefore formulate the metadata indication to indicate that default processing lab. Other examples are possible as well.

Further, each processing lab can be identified in many different ways. As examples, a processing lab can be identified by name (e.g., "John's Processing Lab"), by a code (which a suitable translation table can map to the processing lab), by network address (e.g., an IP address to which a digital image file can be sent for printing), or by a universal resource identifier (e.g., a URL of a web server to which a digital image file can be sent for printing). Thus, the entity can formulate the metadata indication of a given processing lab to identify the processing lab in these or other ways.

Further, the entity could formulate the metadata indication of processing lab in many ways. For example, the entity could structure the metadata indication as markup language (e.g., XML), using a predefined tag such as <PRINT> with one or more parameters to designate where the image is to be printed. Thus, for instance, if an image is to printed at John's Processing Lab, the entity could formulate the metadata indication as: <PRINT LAB-NAME="John's Processing Lab"></PRINT>. Or if the image is to be sent to John's website at www.johnsprocessinglab.com, the entity could formulate the metadata indication as: <PRINT LAB-URI="www.johnsprocessinglab.com"></PRINT>. Other examples are possible as well.

According to the exemplary embodiment, the entity can then store the metadata processing lab indication within the digital image file, together with the data that represents the underlying image. Preferably, the entity will do so in a standardized way, so that any suitably-programmed processor can later access the metadata processing lab indication as well as the image data.

By way of example, the digital image file may have a metadata portion and an image data portion, and the entity may store the metadata processing lab indication in binary form within the metadata portion. (Additionally, the entity may store a binary representation of image in the image data portion, if the image is not already stored there.) The metadata and image data portions of the file could be discrete sections, or they could be interleaved or otherwise combined.

Figure 5:
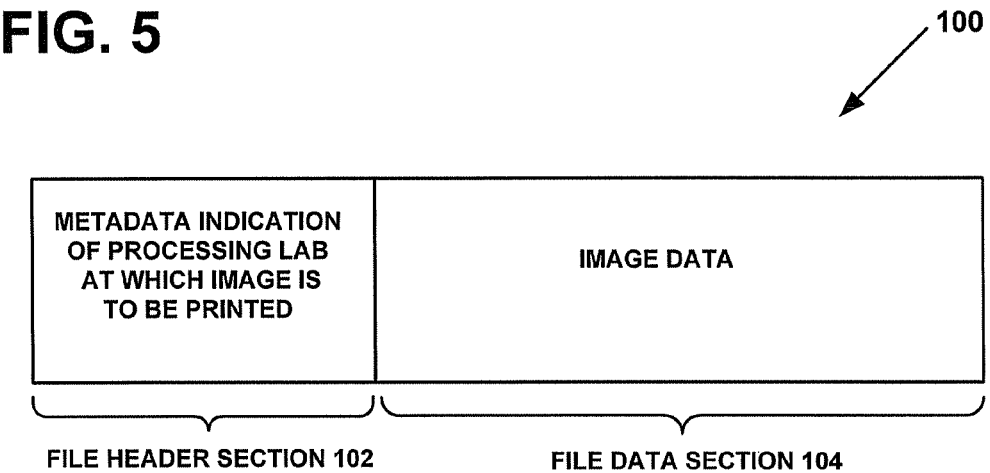
FIG. 5 is a block diagram of a digital image file containing a metadata indication of a processing lab at which an image in the file should be printed (i.e., where the file should be sent for printing)

FIG. 5, for instance, depicts an exemplary digital image file 100. As shown in FIG. 5, the digital image file 100 includes a file header section 102 and a file data section 104. In this example, the entity has stored the metadata processing lab indication within the file header section 102, and the entity has stored or maintained the image data within the file data section 104. Thus, a processor can readily read the metadata from this image file by referring to the file header section, and a processor can readily read the image data from the file by referring to the file data section.

Given an image file that has been marked with a metadata indication of a processing lab at which the image should be printed, a digital camera or other entity can read the metadata indication and then transmit the image file to the designated processing lab for printing. Or the digital camera or other entity can simply transmit the image file to an image hub, which can then read the metadata indication and route the file to the designated processing lab for printing. In either case, the digital camera or other entity can transmit the file over any sort of communication link, whether wired or wireless.

Figure 6:
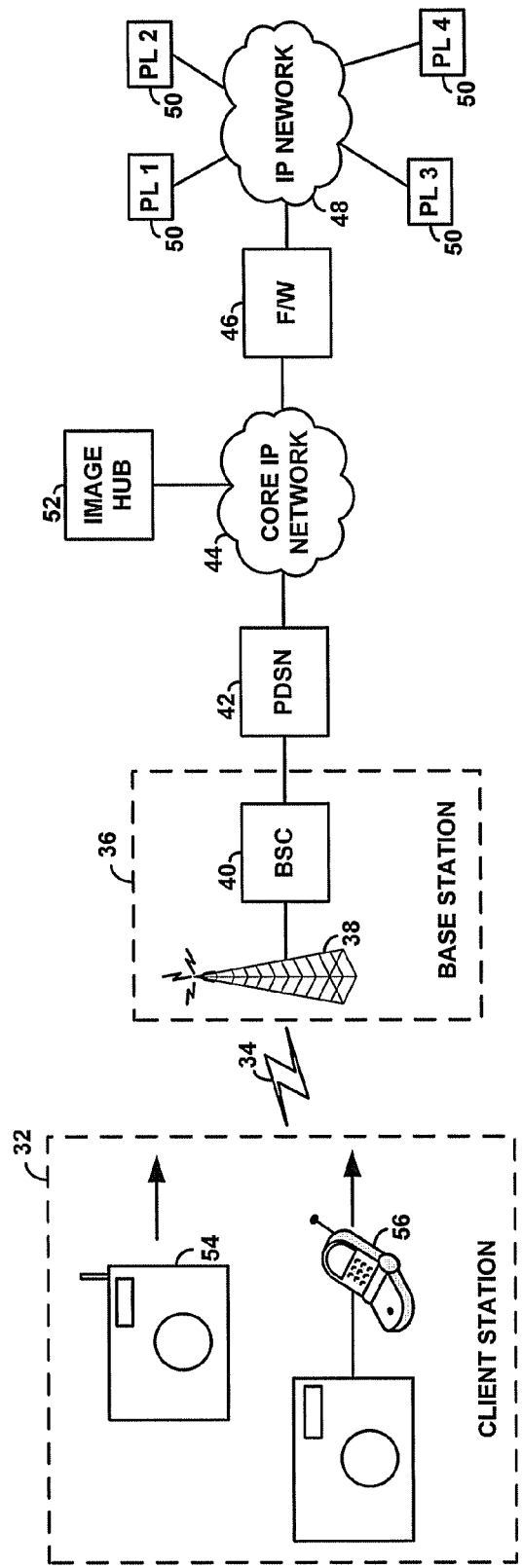
FIG. 6 is a block diagram of a wireless communication system for communicating a digital image file from a client station to a processing lab designated by a metadata indication in the file, or to an image hub for routing of the file in turn to a processing lab designated by a metadata indication in the file.

FIG. 6, for instance, illustrates an exemplary wireless network arrangement 30 that can be used to transmit a digital image file to an image hub or to a processing lab. Arrangement 30 includes a client station 32, which is set to communicate over a radio frequency (RF) air interface 34 with a cellular base station 36. Base station 36, in turn, includes a base transceiver station (BTS) 38, which provides an antenna for communicating with the client station, and a base station controller (BSC) 40, which controls communications via the BTS. BSC 40 is then coupled to a gateway (e.g., a packet data serving node (PDSN)) 42 that provides connectivity with a wireless carrier's core IP network 44. The core network 44 is then coupled by a firewall 46 to the public IP network (e.g., the Internet) 48. And a plurality of image processing labs 50 reside on, or are accessible through, the public network 48.

As further shown in FIG. 6, exemplary arrangement 30 includes an image hub 52, disposed on the carrier's core network 44. With this arrangement, client station 32 can send a digital image file marked with a metadata processing lab indication to the image hub 52, and, as described above, the image hub can then read the metadata indication and responsively route the image file to the designated processing lab. Alternatively, the client station itself could read the metadata indication from the file and responsively send the image file over the wireless link to the designated processing lab for printing.

As shown by way of example in FIG. 6, client station 32 could take various forms. For instance, the client station could be a digital camera 54 that captures the image and/or that marks the image file with the metadata processing lab indication. In that event, the digital camera would include wireless communication functionality, to facilitate communication over the air interface 34 with the base station 36.

Alternatively, the client station 32 could be a more conventional communication device 56, such as a mobile station as noted above. In that event, the communication device could obtain the digital image file (e.g., from the digital camera) already marked with a metadata processing lab indication, or the communication device itself could add the metadata indication to the image file itself. Further (although not shown), the communication device 56 itself could include image capture functionality (as an add on module or as an integral component), in which case it would function as a digital camera as well.

Figure 7:
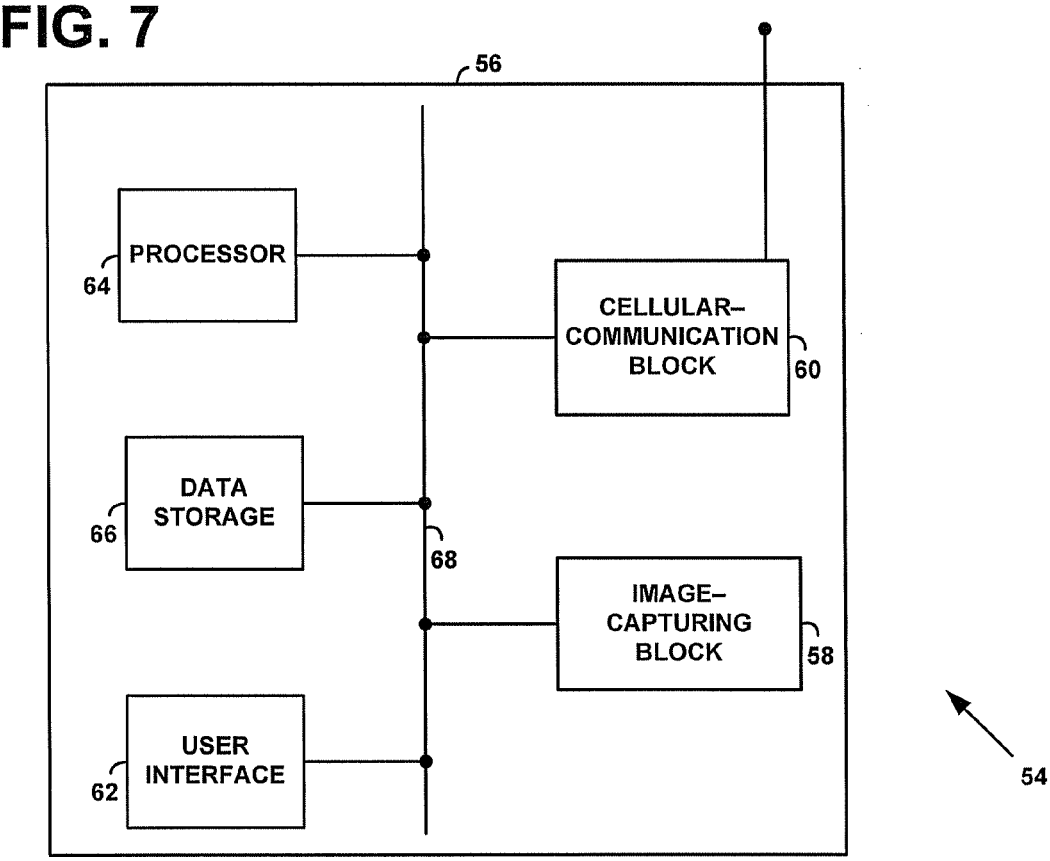
FIG. 7 is a block diagram of a digital camera operable within the exemplary embodiment to write a metadata processing lab indication to an image file and/or to read a metadata processing lab indication from an image file and to responsively send the file to a processing lab designated by the indication.

Considering digital camera 54 as an example of a client station 32, FIG. 7 is a functional block diagram of an exemplary digital camera 54. (Note that some or all of these functions could be included in other forms of client stations as well.) As shown in FIG. 7, the exemplary digital camera 54 includes, within a camera housing 56, an image-capturing block 58, a cellular-communication block 60, a user interface block 62, a processor 64 and data storage 66, all of which may work together and may be communicatively linked together by a system bus 68.

These components may permanently reside in the digital camera or may be temporarily linked to the digital camera. (For example, if the camera is primarily a digital camera, the cellular-communication block 60 might be an add-on card or other module, such as a Sprint PCS Wireless Web Modem™ Aircard 510 manufactured by Sierra Wireless for instance. And as another example, if the camera is primarily a mobile station, the image-capturing block 58 might be an add-on camera module.)

Image-capturing block 58 functions to capture an image into the digital camera. As such, the image-capturing block will preferably include features that are commonly found in a digital camera, such as a lens for receiving light that defines the image, a flash for illuminating the scene being photographed, and a mechanism to establish a digital representation of the image. The mechanism may include a CCD or CMOS image sensor array, which resolves the light into pixels, and a digitizer that establishes digital representations of the pixels. The image-capturing block may then work cooperatively with the processor 64, passing an array of the digital pixel representations to the processor for storage in a digital image file. (Alternatively, the image-capturing block could be an optical scanner mechanism or could take still other forms.)

Cellular-communication block 60, in turn, preferably functions to establish and engage in communications over RF air interface 34 with base station 36. In this regard, the digital camera 54 and base station 36 may communicate over the air interface 34 according to any agreed air interface protocol, such as CDMA, TDMA, GPRS/GSM or 802.11b, for instance. By way of example, the air interface protocol may be CDMA, which is defined by industry standards IS-95A/95B and, more recently, IS-2000 (e.g., TIA/EIA Interim Standard IS-2000-5) published by the Telecommunications Industry Association (TIA). The details of CDMA, and IS-95/IS-2000 in particular, are well known to those of ordinary skill in the art.

To facilitate communication over a CDMA air interface with base station 36, cellular-communication block 60 may comprise a CDMA chipset and an antenna, for instance. Exemplary CDMA chipsets and antennas are those found conventionally in CDMA-capable mobile stations or wireless communication devices, such mobile stations made to operate within the Sprint PCS wireless network for instance. An example CDMA chipset is the MSM5000™ chipset manufactured by Qualcomm Incorporated of San Diego, Calif.

Preferably, the cellular-communication block 60 will allow for packet-data communication via PDSN 42. For instance, after securing a radio link over air interface 34, the cellular-communication block 60 may negotiate with PDSN 42 to secure a data link (typically a point-to-point protocol (PPP) link), and may obtain an IP address (typically a mobile IP address). The digital camera 54 can then communicate packet data with entities on network 44 or network 48, such as image hub 52 and/or processing labs 50, so as to send digital image files, for instance.

User interface block 62, in turn, may include a display (e.g., LCD) for presenting captured digital images, and for presenting text-based and/or graphics-based menus or prompts to users. Additionally, user interface block 62 preferably includes one or more input mechanisms, such as buttons, or a touch-sensitive display.

Data storage 66 then serves to store data, such as digital image files as well as logic executable by processor 64 to carry out various functions described herein. As such, data storage 66 may take various forms, in one or more parts. For example, data storage 66 may comprise a storage block resident permanently in the digital camera, which holds program instructions and data defining logic executable by the processor. And data storage 66 may further comprise a removable storage medium, such as a Flash memory card for instance, that holds digital image files.

In the exemplary embodiment, the logic may include a list of one or more image processing labs at which digital images can be printed, such as the four processing labs 50 shown in FIG. 6. In this regard, for instance, the logic could include a table of available processing labs. And, for each available processing lab, the table could specify a respective name, URI, network address or some other indicator of the processing lab.

Additionally, the logic may define a mechanism for selecting or determining a processing lab at which a given image should be printed. For instance, the logic could define a prompt that processor 64 can display on the user interface display screen, preferably together with a given stored image (e.g., superimposed over the image, or next to the image for instance), asking for a user selection or indication of a processing lab at which the image should be printed. And the logic can then include program instructions that are executable by the processor 64 to receive a user-instruction indicating a desired processing lab (by user selection from a list or specification through text or voice input for instance). Alternatively, the logic might define a default processing lab at which some or all images are to be printed.

Further, the logic may include program instructions that are executable by the processor 64 to generate a metadata indication of the processing lab at which a given image should be printed, and to store the metadata indication in the digital image file. For instance, the logic may provide for generating an XML indication and storing the indication in a file header portion of the image file, as described above.

And the logic may further include program instructions that are executable by the processor to read a metadata indication of processing lab from a digital image file and to responsively send the digital image file, via cellular-communication block 60, to the designated processing lab. For instance, a metadata processing lab indication in a given image file may point to a particular IP address of a processing lab to which the image file should be sent for printing. Thus, upon reading that metadata indication, the processor may packetize and send the image file to that IP address.

Further, the logic may include program instructions that are executable by the processor to send a digital image file, via cellular-communication block 60, to the image hub 52. And image hub 52 could then programmatically read the metadata processing lab indication in the image file and route the file accordingly to the designated processing lab for printing.

An exemplary embodiment of the present invention has been described above. Those skilled in the art will understand, however, that changes and modifications may be made to this embodiment without departing from the true scope and spirit of the present invention, which is defined by the claims.

I claim:

1. A method comprising:
    capturing an image into a digital camera;
    storing the image as an image file in the digital camera;
    receiving into the digital camera a user-instruction specifying a processing lab at which the image should be printed;
    storing an indication of the specified processing lab as metadata in the image file; and
    subsequently (i) reading the indication of the specified processing lab from the metadata in the image file, and (ii) responsively sending the image file over a data network to the specified processing lab for printing.

2. The method of claim 1, wherein sending the image file over the data network to the specified processing lab comprises the digital camera sending the image file over the data network to the specified processing lab.

3. The method of claim 1, wherein sending the image file over the data network to the specified processing lab comprises sending the image file wirelessly from the digital camera to a cellular base station, wherein the image file thereafter passes over the data network to the specified processing lab.

4. The method of claim 1, further comprising, after capturing the image into the digital camera, the digital camera prompting a user to provide the user-instruction.

5. The method of claim 4, further comprising presenting the image on a display screen of the digital camera,
    wherein prompting a user to provide the user-instruction comprises presenting on the display screen, concurrently with the image, a text prompt requesting the user to select from a set of available processing labs.

6. The method of claim 1, wherein storing the indication of the specified processing lab as metadata in the image file comprises storing the indication in the image file in the digital camera.

7. The method of claim 6, further comprising sending the image file, including the indication of the specified processing lab, from the digital camera to a communication device, wherein:
    reading the indication of the specified processing lab from the metadata in the image file comprises the communication device reading the indication of the specified processing lab from the metadata in the image file; and
    sending the image file over a data network to the specified processing lab for printing comprises the communication device sending the image file over a data network to the specified processing lab for printing.

8. The method of claim 7, wherein the communication device comprises a cellular mobile terminal.

9. The method of claim 7, wherein sending the image file over the data network to the processing lab comprises sending the image file over a communication path comprising an air interface link from the communication device.

10. A method comprising:
    capturing an image into a digital camera;
    storing the image as an image file in the digital camera;
    receiving a user-instruction specifying a processing lab at which the image should be printed;

responsive to the user-indication, storing in the image file a metadata indication of the specified processing lab;

sending the image file from the digital camera to an image hub, so that the image hub receives the image file, including the metadata indication of the specified processing lab, and thereby learns where the image should be printed; and reading from the image file the metadata indication of the specified processing lab, and responsively sending the image file from the image hub to the specified processing lab, to facilitate printing of the image at the specified processing lab.

11. The method of claim 10, wherein receiving the user-instruction comprises receiving the user-instruction into the digital camera.

12. The method of claim 11, further comprising, after capturing the image into the digital camera, prompting a user to provide the user-instruction.

13. The method of claim 12, further comprising presenting the image on a display screen on the digital camera, wherein prompting a user to provide the user-instruction comprises presenting on the display screen, concurrently with the image, a text prompt requesting the user to select from a set of available processing labs.

14. The method of claim 10, further comprising:

transferring the image file from the digital camera to a communication device, wherein sending the image file over the data network to the image hub comprises sending the image file over the data network from the communication device to the imaging hub.

15. The method of claim 14, wherein storing in the image file the metadata indication of the processing lab at which the image should be printed comprises the communication device storing in the image file the metadata indication.

16. The method of claim 14, wherein the communication device comprises a cellular mobile station, wherein sending the image file over the data network to the image hub comprises sending the image file over a communication path comprising an air interface.

17. The method of claim 10, wherein sending the image file over the network to the image hub comprises sending the image file over the network from the digital camera to the image hub.

18. The method of claim 10, further comprising:

receiving the image file at the image hub;

reading, from the image file, the metadata indication of the processing lab; and responsively sending the image file to the processing lab for printing.

19. A digital camera comprising:

a lens for receiving light indicative of an image;

data storage for storing a digital image file representative of the image;

a processor;

a network communication interface coupled with the processor;

a user interface; and program instructions executable by the processor (i) to receive, from the user interface, a user-instruction specifying a processing lab at which the image should be printed and (ii) to responsively store in the digital image file a metadata indication of the specified processing lab, wherein the program instructions are further executable by the processor to read the metadata indication of the specified processing lab from the digital image file and to responsively transmit the digital image file, via the network communication interface, to the specified processing lab.

20. The digital camera of claim 19, wherein the network communication interface comprises a wireless interface unit, and wherein the wireless interface unit wirelessly transmits the digital image file.

21. The digital camera of claim 20, wherein the wireless interface unit is a CDMA interface unit.

22. The digital camera of claim 19, wherein the user interface comprises a display screen, and wherein the program instructions are further executable to present on the display screen a prompt requesting the user to provide the user-instruction.

* * * * *